US006874641B2

(12) United States Patent
Clary

(10) Patent No.: US 6,874,641 B2
(45) Date of Patent: Apr. 5, 2005

(54) HYDRODYNAMIC BEARING

(75) Inventor: Robert S. Clary, Concord, CA (US)

(73) Assignee: Laars, Inc., Newport Beach, CA (US)

( * ) Notice: Subject to any disclaimer, the term of this patent is extended or adjusted under 35 U.S.C. 154(b) by 0 days.

(21) Appl. No.: 10/412,817

(22) Filed: Apr. 9, 2003

(65) Prior Publication Data
US 2004/0200770 A1 Oct. 14, 2004

(51) Int. Cl.$^7$ .............................. B08B 3/04; B01D 29/66

(52) U.S. Cl. ......................... 210/391; 134/138; 134/152

(58) Field of Search ........................ 210/391; 134/137, 134/138, 149, 151, 152, 153

(56) References Cited
U.S. PATENT DOCUMENTS

| 3,608,567 | A | * | 9/1971 | Neill, Jr. ................... 134/58 R |
| 4,377,175 | A | * | 3/1983 | Fritz ........................... 134/138 |
| 5,330,065 | A | * | 7/1994 | Bradley ...................... 211/163 |
| 5,989,419 | A |   | 11/1999 | Dudley et al. |
| 6,152,155 | A | * | 11/2000 | Milligan ..................... 134/138 |
| 6,156,213 | A |   | 12/2000 | Dudley et al. |
| 6,336,976 | B1 | * | 1/2002 | Usui ............................. 134/1 |
| 2001/0047818 | A1 | * | 12/2001 | Bastien ...................... 134/138 |

FOREIGN PATENT DOCUMENTS

JP     9-225418 A  *  9/1997

* cited by examiner

Primary Examiner—Fred G. Prince
(74) Attorney, Agent, or Firm—Buchanan Ingersoll PC

(57) ABSTRACT

A self-cleaning filter assembly includes a cylindrical cartridge filter element supported on a coaxially mounted hydrodynamic bearing for rotation of the cartridge filter element about its longitudinal axis. The cylindrical cartridge filter element includes a hollow interior for receiving filtered water. A water spray manifold is provided proximate to the cartridge filter element and includes spray nozzles for providing a water spray capable of rotating the cartridge filter element about its longitudinal axis. A diverter valve receives flow of water to be filtered. With the diverter valve in a first position, the received flow of water submerges the cartridge filter element, with the filtered water received at the hollow interior of the cartridge filter element. With the diverter valve, in a second position, the received flow of water is provided to the water spray manifold causing it to fill under pressure. Water sprays out of the spray nozzles directed at the cartridge filter element causing it to rotate about its longitudinal axis. The water spray cleans the cartridge filter element as it rotates. Additionally, with the diverter valve in its second position, a portion of the water flow to the water spray manifold is tapped off and provided to the hydrodynamic bearing to provide a film of water as the load bearing component allowing rotation of the cartridge filter element thereon.

20 Claims, 8 Drawing Sheets

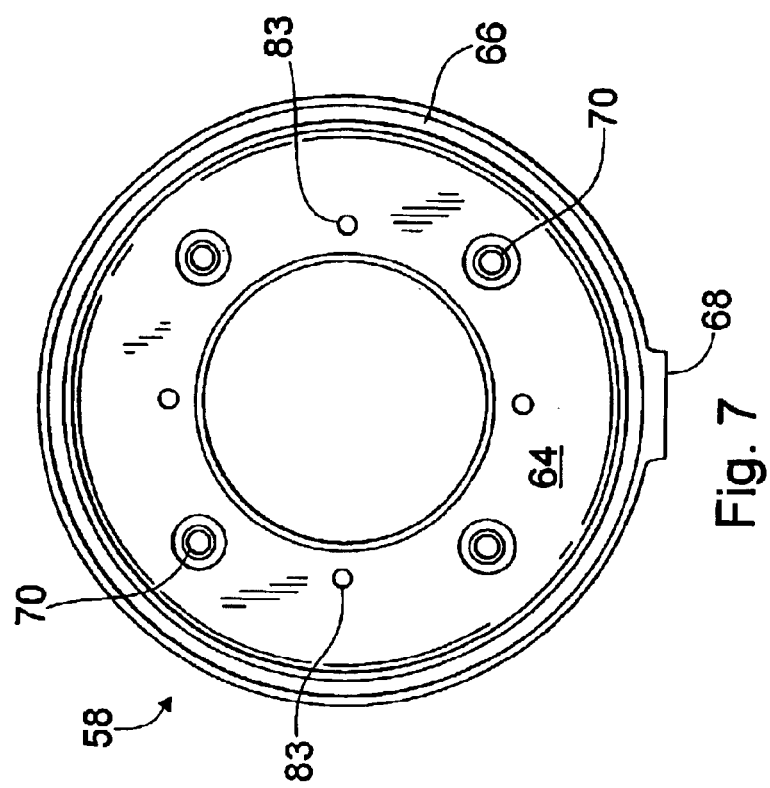
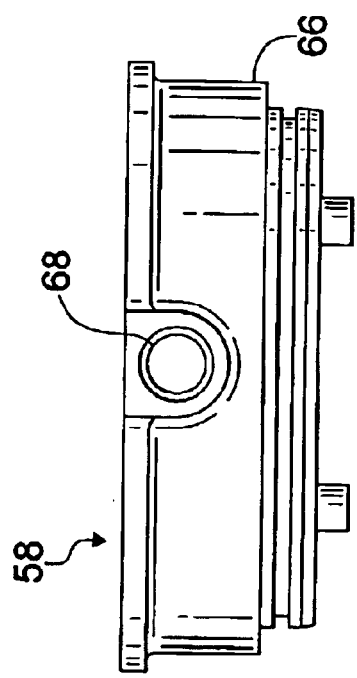

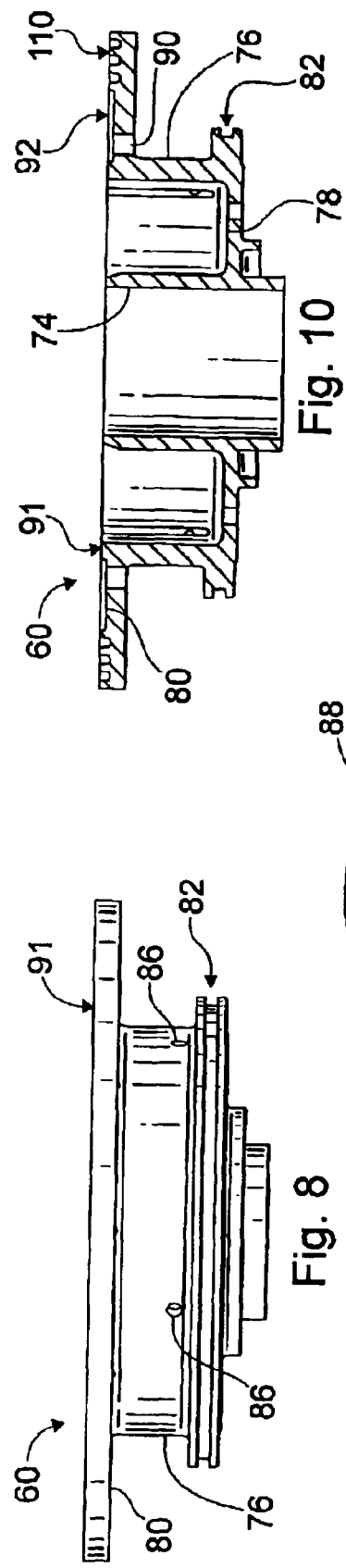

HYDRODYNAMIC BEARING

FIELD OF THE INVENTION

The present invention is directed toward filters for liquids and, more particularly, toward a self-cleaning water filter for use in swimming pools and the like.

BACKGROUND OF THE INVENTION

Swimming pools typically use a filtration process to remove dirt and other foreign particles which accumulate in the pool water. The pool water is pumped by a variety of known means to a filter which removes the dirt and other solid particles from the pool water. Filtered pool water is then discharged from the filter directly back to the pool. In addition to making the pool water visually appealing, removal of foreign particles by filtration helps in decreasing the disinfectant demand, typically chlorine, of the pool water necessary for killing disease causing bacteria. Typically, five basic types of filter systems are utilized for swimming pools, namely, pressure sand, pressure diatomaceous earth, vacuum diatomaceous earth, gravity sand, and cartridge type filters.

As the filtration process takes place, filtered particles accumulate in the filter adding resistance to, and decreasing the water flow through, the filter. Typically, once the water flow through the filter falls below a specified flow rate or pressure, it is recommended that the filter be cleaned. With regard to cartridge-type filters, the cartridge filter element is typically removed from the filter housing and rinsed/cleaned with a garden hose to remove the filtered dirt and other solid particles therefrom.

During normal operation, the water to be filtered typically accumulates in the cartridge filter housing and submerges the filter cartridge. Filtered water collects at an inner volume of the filter cartridge and is drained or pumped back to the pool. Conventional filter cartridges include a plurality of longitudinal pleat folds used for filtering. Each of these longitudinal pleat folds must be cleaned. Typical filter cartridges take about 20–30 minutes to clean by spraying with a garden hose. Cleaning in this manner with a garden hose also has a disadvantage in that the force of the applied water pushes some of the filtered debris deeper into the filter medium of the longitudinal pleat folds, since the build up of filtered debris typically occurs at the outer diameter of the filter cartridge. Experience has shown that the periodical removing and cleaning of filter cartridges has become a chore that many pool owners skip. Periodical cleaning of the filter cartridges is important since a cartridge filter that sits dirty too long, dries and becomes impacted with filtered debris and cannot be cleaned. If this happens, a new filter cartridge must be purchased.

The present invention is directed toward overcoming one or more of the above-identified problems.

SUMMARY OF THE INVENTION

A self-cleaning filter assembly is provided in accordance with the present invention. The self-cleaning filter assembly includes a cylindrical cartridge filter element supported on a coaxially mounted hydrodynamic bearing for rotation of the cartridge filter element about its longitudinal axis. The cylindrical cartridge filter element includes a hollow interior for receiving filtered water. A film of water is used by the hydrodynamic bearing as the load bearing component enabling rotation of the cartridge filter element. The self-cleaning filter assembly further includes a water spray manifold provided proximate to the cartridge filter element and having spray nozzles for providing a water spray capable of rotating the cartridge filter element about its longitudinal axis. In operation, a flow of water to be filtered is received by a diverter valve mounted to the filter assembly and positionable between first and second positions. In the first position, the diverter valve directs the received flow of water to the cartridge filter element, i.e., submerges the cartridge filter element for filtering. The filtered water is received at the hollow interior of the cartridge filter element and returned to the pool. In the second position, the diverter valve provides the received flow of water to the water spray manifold causing it to fill under pressure and water sprays out of the spray nozzles directed at the cartridge filter element causing it to rotate about its longitudinal axis. The water spray cleans the cartridge filter element as it rotates. Additionally, with the diverter valve in its second position, a portion of the water flow to the water spray manifold is tapped off and directed to the hydrodynamic bearing and provides the film of liquid used by the hydrodynamic bearing as the load bearing component.

A filter housing is also provided completely enclosing the cartridge filter element, hydrodynamic bearing and water spray manifold. The filter housing includes three bi-directional ports formed therein. The self-cleaning filter assembly further includes a discharge plenum also enclosed by the filter housing. The discharge plenum is in fluid communication with the cartridge filter element and includes bottom and side surfaces defining a receptacle for receiving the filtered water from the hollow interior of the cartridge filter element, and an outlet port formed in the side surface thereof. The discharge plenum is selectively and removeably attachable to the filter housing to orient its outlet port in fluid communication with any of the three ports formed in the filter housing. Thus, any of the three ports may be utilized as a filter return port for returning filtered water back to the pool or other source.

In one form, the discharge plenum is rotatably attached to the filter housing and selectively rotatable to orient the outlet port in fluid communication with any of the three ports formed in the filter housing. The diverter valve is mountable to one of the other two filter ports which are not in fluid communication with the outlet port of the discharge plenum. The remaining filter port is utilized to receive waste water exterior to the cartridge filter element from the water spray manifold. Thus, the three filter ports may be interchangeably utilized as the filter inlet, return and waste ports depending on the desired filter configuration.

The hydrodynamic bearing includes a stationary manifold having an inlet for receiving a pressurized flow of water to be utilized as the load bearing component, a first bearing member received in and attached to the manifold, and a second bearing member operatively connected to the first bearing member for rotation with respect to the first bearing member.

The first bearing member includes an inner cylindrical wall having an axis, an outer cylindrical wall radially spaced from, and coaxial with, the inner cylindrical wall, a bottom member connected between the inner and outer cylindrical walls, and a first disc member extending radially outward from the outer cylindrical wall. The first bearing member is received in and attached to the manifold such that the outer cylindrical wall, the first disc member and the manifold together define a channel for the received pressurized flow of water at the manifold inlet. A plurality of radial dynamic pressure generating apertures are formed in the outer cylindrical wall of the first bearing member and communicate with the channel. Similarly, a plurality of axial dynamic pressure generating apertures are formed in the first disc member of the first bearing member and also communicate with the channel.

The second bearing member is designed to support an object, e.g., a cartridge filter element, for rotation about its axis. The second bearing member includes a cylindrical portion received between the inner and outer cylindrical walls of the first bearing member, and a second disc member extending radially outward from the cylindrical portion and facing the first disc member with the first and second bearing members operatively connected.

In operation, pressurized water is received by the manifold at its inlet and fills the channel. The pressurized water is provided against the cylindrical portion of the second bearing member via the radial dynamic pressure generating apertures in the first bearing member, and also against the second disc member of the second bearing member via the axial dynamic pressure generating apertures in the first bearing member, providing a thin film of water as the load bearing opponent and allowing the second bearing member and the cartridge filter element supported thereon to rotate about the axis.

In another form, an inner surface of the outer cylindrical wall of the first bearing member includes a plurality of dynamic pressure generating grooves cooperating, one each, with the plurality of radial dynamic pressure generating apertures. In a preferred form, the plurality of dynamic pressure generating grooves extend axially and substantially parallel to the axis.

In a further form, a top surface of the first disc member of the first bearing member includes a plurality of dynamic pressure generating recessed portions cooperating, one each, with the plurality of axial dynamic pressure generating apertures. Each of plurality of dynamic pressure generating recessed portions preferably includes a bottom surface and angled side surfaces.

Preferably, the pluralities of radial and dynamic pressure generating apertures, and cooperating grooves and recessed portions, respectively, are equiangularly spaced about the axis.

In an additional form, the pressurized water is provided to the manifold channel to allow rotation of the second bearing member with the hydrodynamic bearing in an energized state, which corresponds to the second position of the diverter valve. The first and second disc members cooperate to form a seal preventing water from flowing into the hydrodynamic bearing with the hydrodynamic bearing in an unenergized state (diverter valve in first position), and permitting a minimal amount of water to flow out of the hydrodynamic bearing through the seal with the hydrodynamic bearing in the energized state (diverter valve in second position). Preferably, the seal includes a labyrinth-type seal having cooperating teeth formed on facing surfaces of the first and second disc members at outer circumferential portions thereof.

The diverter valve includes a housing mountable to the filter housing and having an inlet for receiving a flow of water to be filtered and an outlet opening into the filter with the diverter housing mounted thereto. A diverter element is mounted in the diverter housing and extends into the filter through one of the filter ports with the diverter housing mounted thereto. The diverter element is positionable between a first position wherein the diverter element directs water at the diverter housing outlet into the filter housing to submerge the cartridge filter element for normal filtering operation, and a second position wherein the diverter element directs water at the diverter housing outlet to the water spray manifold provided proximate to the cartridge filter element to provide a spray of water capable of rotating the cartridge filter element on the hydrodynamic bearing to clean the cartridge filter element. A portion of the water to the water spray manifold is tapped off and directed to the hydrodynamic bearing for use as the load bearing component.

An actuation element is attached to the diverter housing and is keyed to the diverter element for rotation of the diverter element between the first and second position. Preferably, rotation of the diverter element between the first and second position encompasses a rotation of 90° in either rotational direction.

The diverter element includes an elongate body having a hollow cylindrical end portion extending into the filter with the diverter housing mounted thereto. The cylindrical end portion includes first and second openings formed opposite one another. With the diverter element in the first position (normal filtering), water at the diverter housing outlet is split and directed through the first and second openings and into the filter. With the diverter element in the second position (cleaning cycle), one of the first and second openings are blocked off and the other is in fluid communication with the water spray manifold.

It is an object of the present invention to provide a self-cleaning filter of the cartridge type which allows easy cleaning of the cartridge filter element.

It is a further object of the present invention to provide a cartridge type filter which enables the cartridge filter element to be cleaned without having to physically remove it from the filter.

It is yet a further object of the present invention to provide a filter having interchangeable inlet, return and waste ports.

It is still a further object of the present invention to provide a filter of the cartridge type that can be automatically cleaned upon initiation by a user.

Other aspects, objects and advantages of the present invention can be obtained from a study of the application, the drawings, and the appended claims.

BRIEF DESCRIPTION OF THE DRAWINGS

FIG. 6 is a front view of the manifold included in the hydrodynamic bearing;

FIG. 7 is a top view of the manifold shown in FIG. 6;

FIG. 8 is a front view of the first bearing member included in the hydrodynamic bearing;

FIG. 9 is a top view of the first bearing member shown in FIG. 8;

FIG. 10 is a cross-sectional view of the first bearing member taken along line 10—10 in FIG. 9;

DETAILED DESCRIPTION OF THE INVENTION

Figure 1:
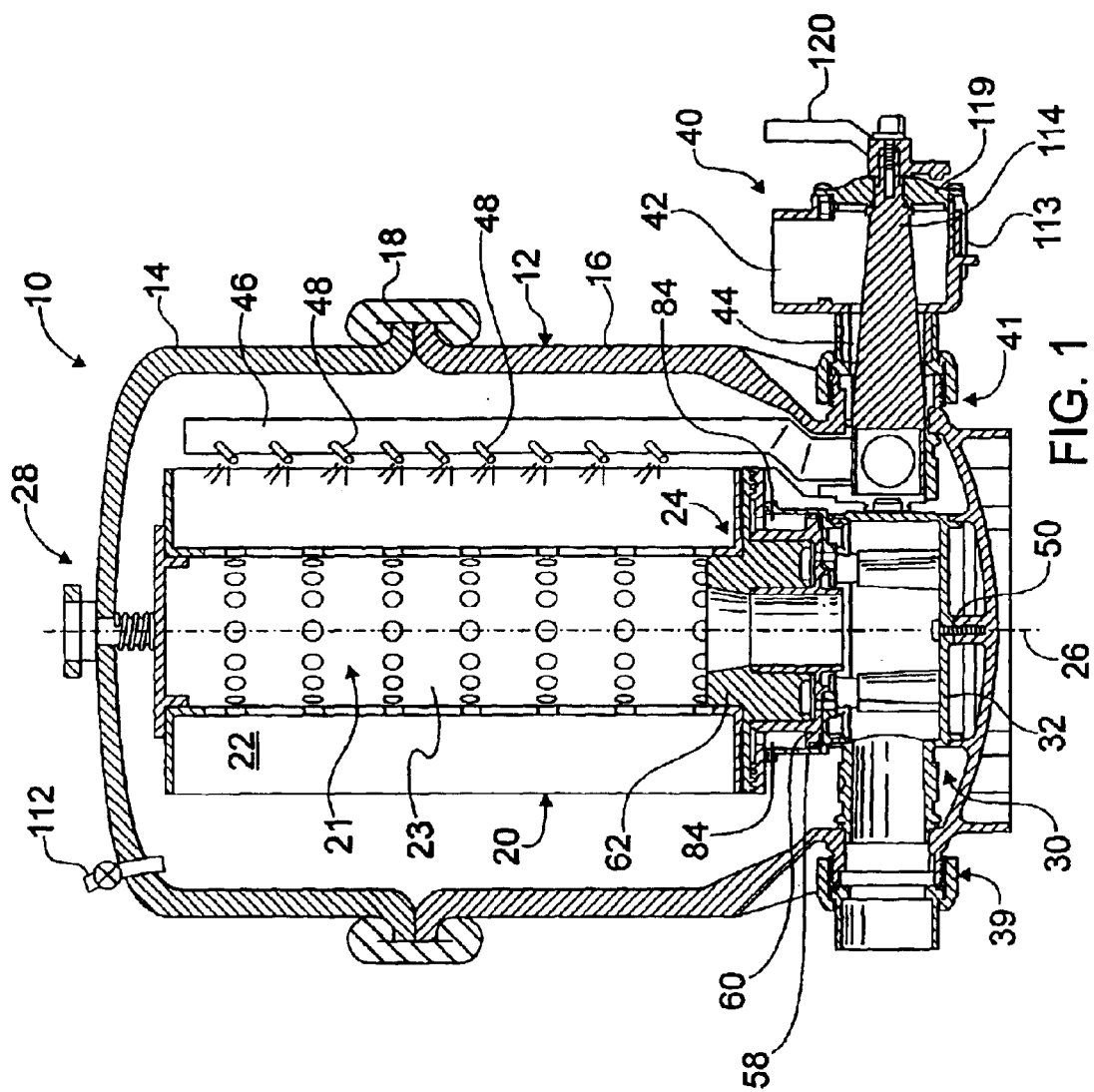
FIG. 1 is a cross-sectional view of a self-cleaning filter according to the present invention.
Figure 2:
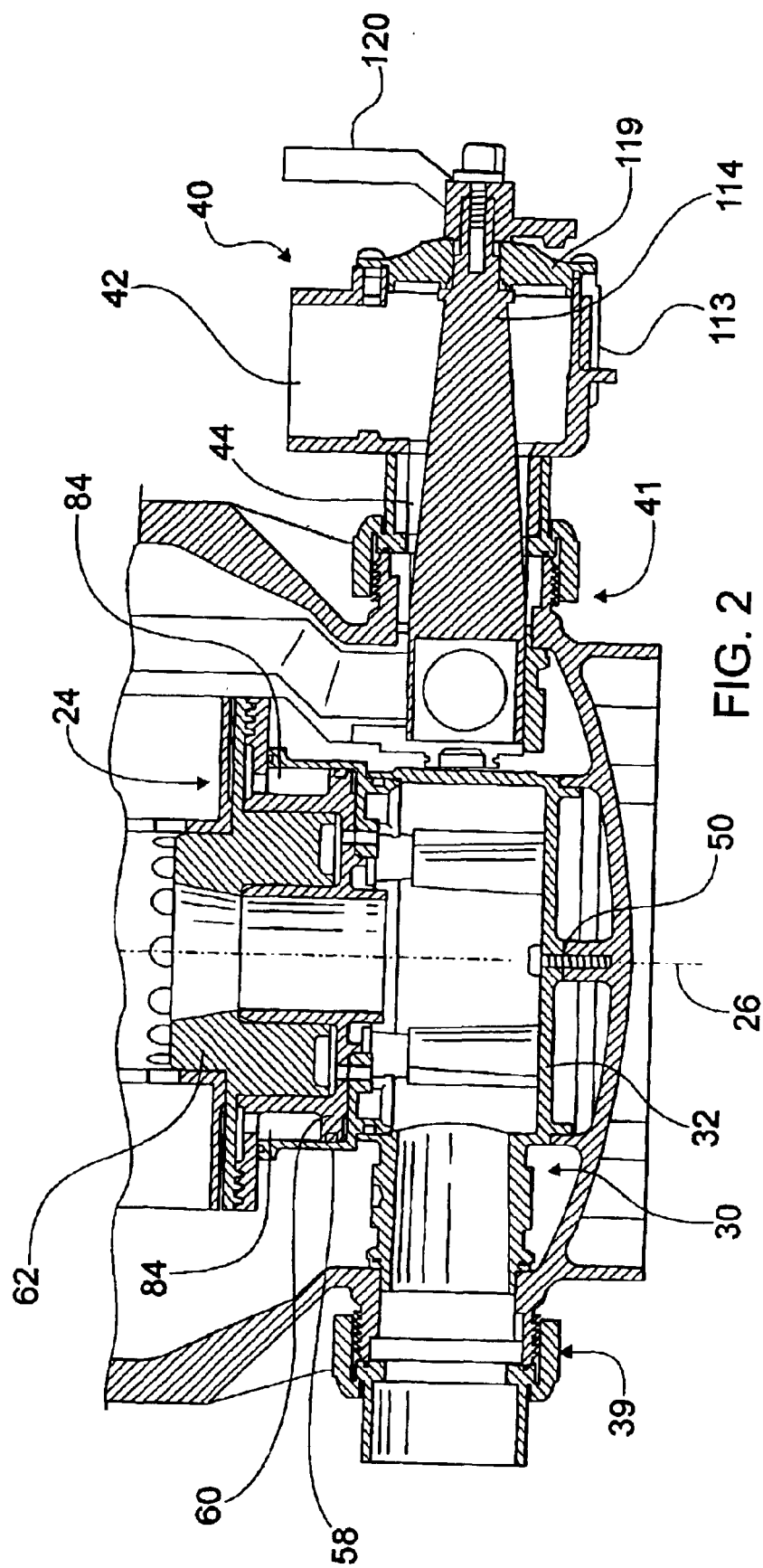
FIG. 2 is an enlarged cross-sectional view of the hydrodynamic bearing, discharge plenum and diverter valve shown in FIG. 1.

FIGS. 1–2 illustrate a self-cleaning water filter, shown generally at 10, in accordance with the present invention. The water filter 10 includes a filter housing 12 having upper 14 and lower 16 filter housings joined together by a band clamp 18, or other conventional joining devices, extending around the full circumference thereof.

The filter 10 is of the cartridge type and includes a cartridge filter element 20 in the general shape of a cylinder having a hollow interior shown at 21. The filter cartridge 20 includes longitudinal pleated folds of filter material 22 supported on a perforated tube 23 opening into the hollow interior 21. A bottom end of the filter cartridge 20 is annually supported on a hydrodynamic bearing 24 allowing free rotation of the filter cartridge 20 about its longitudinal axis 26. A spindle 28 attached to the top center of the upper filter housing 14 biases the filter cartridge 20 against the hydrodynamic bearing 24 and allows the filter cartridge 20 to rotate about its longitudinal axis 26. The hydrodynamic bearing 24 is mounted to a discharge plenum 30.

Figure 3:
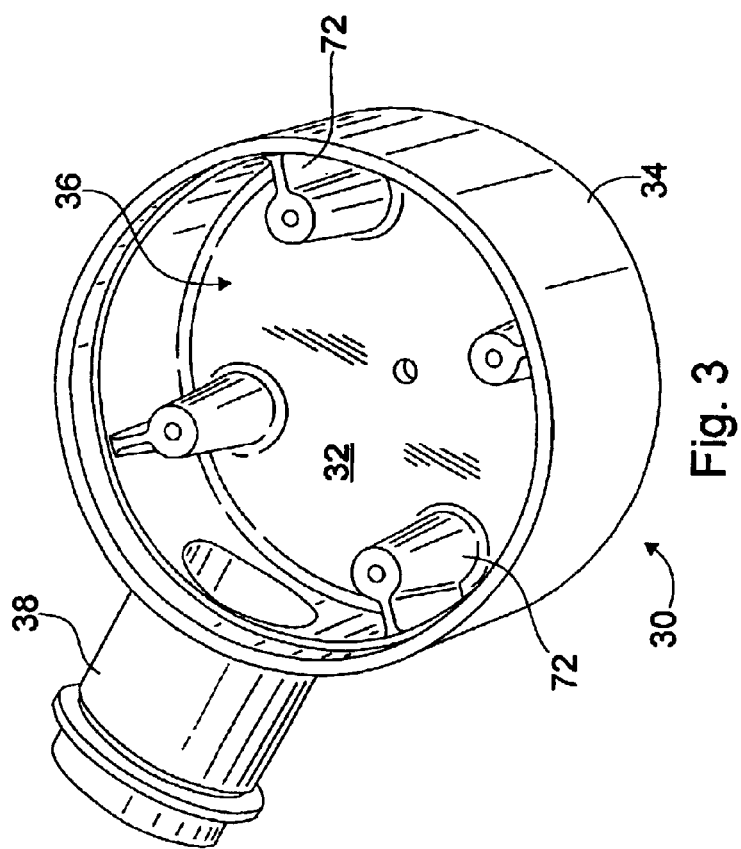
FIG. 3 is a perspective view of the discharge plenum included in the inventive self-cleaning filter.

Referring to FIGS. 1–3, the discharge plenum 30 includes a plenum body having bottom 32 and side 34 surfaces defining a receptacle 36. An outlet port 38 is formed in the side surface 34 and is in fluid communication with the receptacle 36. The hydrodynamic bearing 24 is mounted coaxially with the filter cartridge 20 and is in fluid communication with the hollow interior 21. Filtered water received at the hollow interior 21 flows through the hydrodynamic bearing 24, into the receptacle 36 of the discharge plenum 30, and through the outlet port 38 to a filter return port 39 where it is returned to a pool or other water source (not shown).

Referring to FIGS. 1–2, a diverter valve 40 is mounted to a filter inlet port 41 formed in the filter housing 12 and receives a flow of water to be filtered at its inlet 42. The received water to be filtered flows from the diverter valve outlet 44 and into the interior of the filter housing 12. The diverter valve 40 is positionable between a first position for normal filter operation, and a second position for cleaning the filter cartridge 20.

With the diverter valve 40 in its first position, water flows through the diverter valve 40 and into the filter housing 12 substantially submerging the filter cartridge 20. Filtered water flows into the hollow interior 21 of the filter cartridge 20, through the hydrodynamic bearing 24 and into the receptacle 36 of the discharge plenum 30. The filtered water continues through the outlet port 38 of the discharge plenum 30 to the filter return port 39, where it is conventionally returned to the pool.

With the diverter valve 40 in its second position, the flow of water to the interior of the filter housing 12 is cut off. The water received by the diverter valve 40 is directed under pressure to a water spray manifold 46 provided proximate to the filter cartridge 20 and including a plurality of spray nozzles 48. The pressurized water received by the water spray manifold 46 sprays out of the spray nozzles 48 under pressure and causes the filter cartridge 20 to spin as it is being cleaned. The spray nozzles 48 are directed off-center at the filter cartridge 20 so that the force of the water spray will cause the filter cartridge 20 to spin about its axis 26. The combination of the centrifugal force of the spinning filter cartridge 20 and the water spray from the nozzles 48 clean dirt and other debris from the filter material 22. Waste water sprayed by the manifold 46 and dirt and debris removed from the filter cartridge 20 are received in the filter housing 12 and discharged through a waste port 49 (see FIG. 3). A portion of the water provided to the water spray manifold 46 by the diverter valve 40 is tapped off and provided to the hydrodynamic bearing 24 for use as the load bearing component allowing the filter cartridge 20 to spin under the pressure of the water spray from the nozzles 48, as will be described infra.

Figure 4:
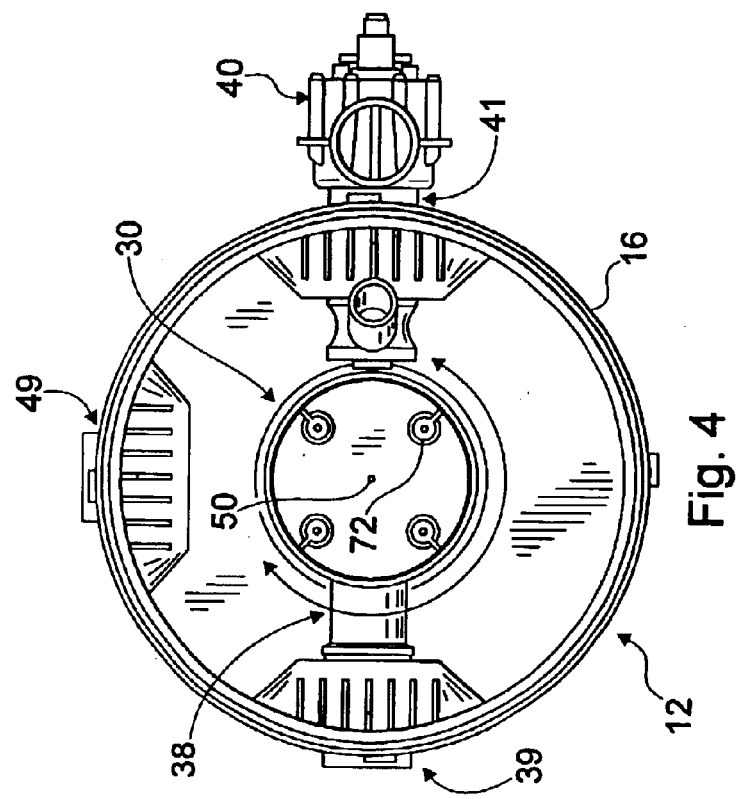
FIG. 4 is a top view of the self-cleaning filter according to the present invention illustrating the discharge plenum and the filter port connections.

As shown more clearly in FIG. 4, the discharge plenum 30 is selectively rotatable such that it may be oriented with various ports in the filter housing 12 to suit various installations. As shown in FIG. 4, the filter housing 12 includes three ports 39, 41 and 49, with port 39 used as a filter return port, port 41 used as a filter inlet port, and port 49 used as a filter waste port. The discharge plenum 30 is attached to the filter housing 12 via a center retaining screw 50. By loosening and removing the center retaining screw 50, the discharge plenum 30 can be rotated and its outlet port 38 selectively oriented with any of the ports 39, 41 and 49 formed in the filter housing 12. Similarly, the diverter valve 40 may be mounted to any of the filter ports 39, 41 and 49, and any filter port may be utilized as the filter waste port. Due to the selective positioning of the discharge plenum 30, its outlet port 38 may be oriented with any of the filter ports 39, 41 and 49, with the diverter valve 40 connected to either of the other two filter ports, and the remaining filter port used as the filter waste port. This flexibility of the discharge plenum 30 permits installation of the filter 10 to a previously constructed system with a minimum number of modifications. It should be understood that the flexibility of the discharge plenum 30 can also be realized when used with filters having more or less than three bi-directional ports.

Figure 5:
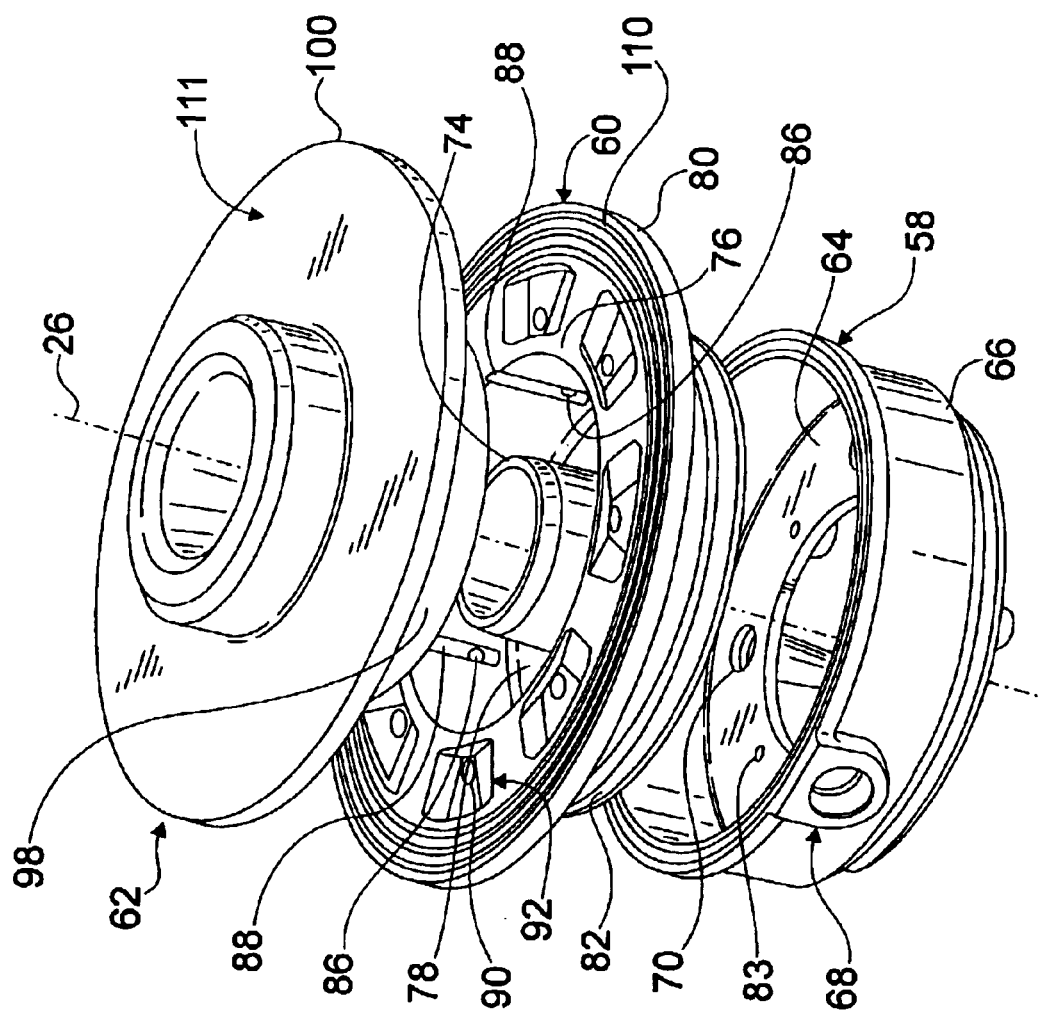
FIG. 5 is an exploded view of the hydrodynamic bearing included in the inventive self-cleaning filter.
Figure 12:
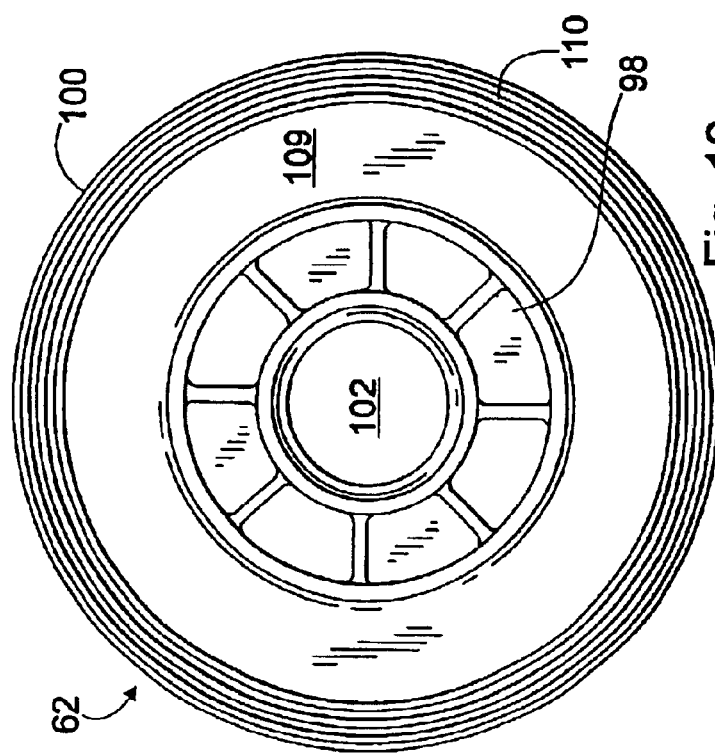
FIG. 12 is a bottom view of the second bearing member shown in FIG. 11.
Figure 11:
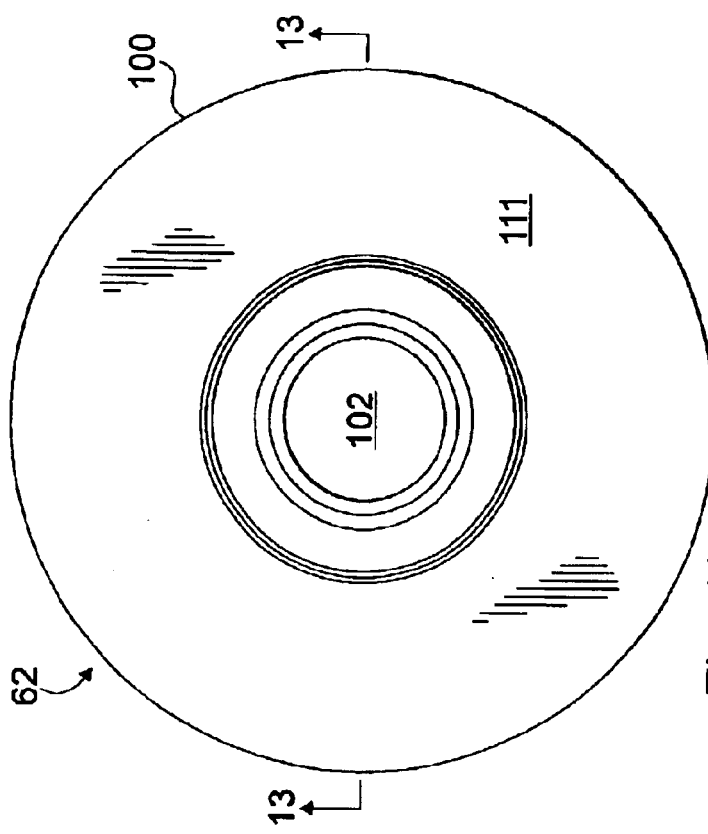
FIG. 11 is a top view of the second bearing member included in the hydrodynamic bearing.
Figure 13:
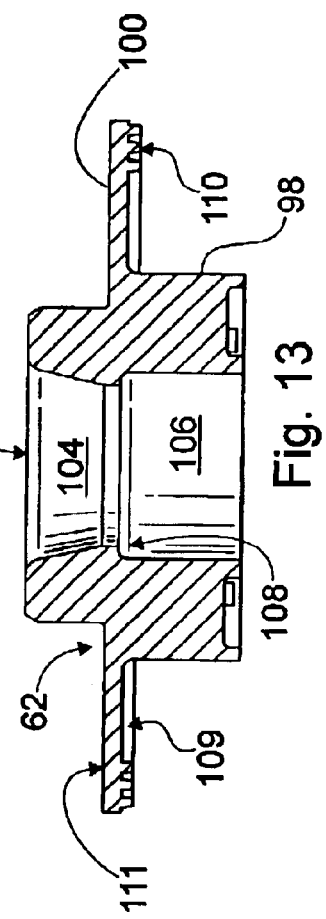
FIG. 13 is a cross-sectional view of the second bearing member taken along line 13—13 in FIG. 11.

As shown in the exploded view of FIG. 5, the hydrodynamic bearing 24 includes a stationary manifold 58, a first bearing member 60 and a second bearing member 62 all coaxially provided along the longitudinal axis 26. Referring to FIGS. 5–7, the manifold 58 is toroidal in shape and includes a bottom 64 having a central opening and a sidewall 66 extending axially from the bottom 64. A water inlet port 68 is formed in the manifold side surface 66 for receiving the portion of water tapped off from the flow of water to the water spray manifold 46 with the diverter valve 40 in its second position. The manifold 58 is attached to the discharge plenum 30 via screws or other connecting means extending through apertures 70 formed in the manifold bottom surface 64 and into cooperating support members 72 (see FIGS. 3–4) formed in the discharge plenum 30.

Referring to FIGS. 5 and 8–10, the first bearing member 60 is received in, and attached to, the manifold 58. The first bearing member 60 includes an inner cylindrical wall 74 having an axis, an outer cylindrical wall 76 radially spaced from and coaxial with the inner cylindrical wall 74, and a bottom member 78 connected between the inner 74 and outer 76 cylindrical walls. A first disc member 80 extends radially outward from the outer cylindrical wall 76. The outer cylindrical wall 76 further includes a flange 82 extending radially outward at an end opposite the first disc member 80. With the hydrodynamic bearing 24 mounted in the filter 10, the axis of the inner cylindrical wall 74 is coaxial with the longitudinal axis 26 of the cartridge filter element 20.

The first bearing member 60 is received in the manifold 58 with the first disc member 80 engaging the top circumferential edge of the manifold sidewall 66. Screws or other connecting means extend through apertures 83 formed in the bottom member 78 and bottom surface 64 to attach the first bearing member 60 to the manifold 58. Attachment in this manner ensures that both the first bearing member 60 and the manifold 58 are stationary and do not rotate. The flange 82 engages the inner surface of the manifold sidewall 66, such that a circumferential channel 84 (see FIGS. 1–2) is formed by the manifold sidewall 66, the outer cylindrical wall 76 and the first disc member 80 for receiving the flow of pressurized water at the manifold inlet 68.

The outer cylindrical wall 76 includes a plurality of radial dynamic pressure generating apertures 86 formed therein which communicate with the channel 84. The inner surface of the outer cylindrical wall 76 includes a plurality of dynamic pressure generating grooves 88 cooperating, one each, with the radial dynamic pressure generating apertures 86. As shown in FIGS. 5 and 10, the grooves 88 extend axially substantially parallel to the axis 26.

The first disc member 80 includes a plurality of axial dynamic pressure generating apertures 90 formed therein which communicate with the channel 84. A top surface 91 of the first disc member 80 includes a plurality of dynamic pressure generating recessed portions 92 formed therein and cooperating, one each, with the axial dynamic pressure generating apertures 90. The recessed portions 92 each include a substantially flat portion 94 cooperating with the axial apertures 90, and radially situated side portions 96 extending from the substantially flat portion 94 up to the top surface 91 of the first disc member 80.

The dynamic pressure generating apertures 86 and 90, and cooperating grooves 88 and recessed portions 92, respectively, are equiangularly spaced about the axis 26 in an alternating arrangement. While eight of each of the apertures 86 and 90, and cooperating grooves 88 and recessed portions 92, are shown herein, any number of dynamic pressure generating apertures 86 and 90 and cooperating grooves 88 and recessed portions 92 may be provided in any spacial arrangement without departing from the spirit and scope of the present invention.

Referring to FIGS. 5 and 11–13, the second bearing member 62 is designed to support an object, namely the cartridge filter element 20, for rotation about the axis 26. The second bearing member 62 includes a cylindrical portion 98 received between the inner 74 and outer 76 cylindrical walls of the first bearing member 60, and a second disc member 100 extending radially outward from the cylindrical portion 98 and facing the first disc member 80. The second bearing member 62 includes an aperture 102 formed therethrough having upper 104 and lower 106 portions. The lower aperture portion 106 includes a lip 108 for engaging the inner cylindrical wall 74 of the first bearing member 60, and the upper aperture portion 104 is configured to receive filtered water from the hollow interior 21 of the filter cartridge 20.

The top surface 91 of the first disc member 80 and the bottom surface 109 of the second disc member face each other and include cooperating teeth 110 formed about outer circumferential portions thereof. With the hydrodynamic bearing 24 assembled, the teeth 110 cooperate to form a seal, similar to a labyrinth seal, substantially preventing water from flowing into or out of the hydrodynamic bearing 24.

Operation of the inventive filter 10 will now be described. The cartridge filter element 20 is supported on the top surface 111 of the second disc member 100 for rotation about the axis 26. With the diverter valve 40 in its first position (normal filter operation), pool water received at the diverter valve inlet 42 is input to the filter housing 12 and substantially submerges the cartridge filter element 20. The water flows through the folded pleats of filter material 22, where dirt and other solid particles are removed, and clean filtered water flows into the hollow interior 21 through the perforated tube 23. The filtered water flows through the hydrodynamic bearing 24 and into the receptacle 36 of the discharge plenum 30. The filtered water flows through the discharge plenum outlet port 38 and is output from the filter 10 at the filter return port 39 where it is conventionally returned to the pool. During normal filter operation, the weight of the saturated filter cartridge 20 pushes down against the first bearing member 62 and closes the seal formed by the cooperating teeth 110, providing a very difficult path for water and contaminants to leak back through the hydrodynamic bearing 24 and into the clean filter discharge.

When the diverter valve 40 is moved to its second position (cleaning position), pool water received at the diverter valve inlet 42 is directed to the water spray manifold 46. Just prior to the cleaning cycle being initiated, an air vent 112 and the filter waste port 49 are opened and any water that is in the filter housing 12 that would otherwise submerge the filter cartridge 20 and prevent it from spinning is drained away through the filter waste port 49. During the cleaning cycle, pressurized water is provided into the water spray manifold 46 and a pressurized spray of water is sprayed out of the spray nozzles 48 at an angle that will hydraulically rotate the filter cartridge 20. The water spray hits the pleated filter material 22 removing dirt and other debris therefrom. The centrifugal force as a result of the filter cartridge 20 spinning also assists in removal of the dirt and other debris by forcing it to the outer edges of the filter cartridge 20 where it can be removed by the water spray. The removed debris and waste water is collected in the filter housing 12 and output through the filter waste port 49.

Rotation of the cartridge filter element 20 about the axis 26 is accomplished via the hydrodynamic bearing 24. With the diverter valve 40 in its second position, a portion of the water to the water spray manifold 46 is tapped off and supplied to the inlet 68 of the manifold 58 by a hose (not shown) connecting the water spray manifold 46 to the manifold inlet 68. This pressurized flow of water enters and fills the channel 84 providing a uniform pressure distribution throughout the entire manifold 58. The pressurized water in the channel 84 supplies the hydrodynamic bearing 24 with two different and distinct fluid bearing concepts, namely, a hydraulic thrust and a fluid journal bearing. Pressurized water is provided through the radial dynamic pressure generating apertures 86 against the cylindrical portion 98 of the second bearing member 62. This pressurized water flows through the apertures 86 and up the grooves 88 to form a thin film of water providing a journal bearing force against the second bearing member 62. Similarly, pressurized water flows from the channel 84 through the axial dynamic pressure generating apertures 90 and against the bottom surface 109 of the second disc member 100. The recessed portions 92 cooperating with the apertures 90 allow a thin film of water to form between the first 80 and second 100 disc members providing a thrust bearing force against the second bearing member 62. These journal and thrust bearing forces support the load of a saturated filter cartridge 20 and allow the filter cartridge 20 to be rotated about the axis 26. By designing the hydrodynamic bearing 24 in this manner, uniform pressure distribution is established throughout the entire channel 84. Further, since water is virtually an incompressible fluid, hydraulic load calculations can be employed to size bearing capacities depending on the weight of the saturated filter cartridge 20. Bearing friction losses are virtually eliminated, and bearing noise is virtually non-existent.

With the hydrodynamic bearing 24 in its energized state, i.e., the diverter valve 40 in its second position, a small amount of water will flow through the tortuous path of the labyrinth seal defined by the cooperating teeth 110. This constant water flow aids in prohibiting contaminants from leaking back through the seal and into the hydrodynamic bearing 24.

Figure 14:
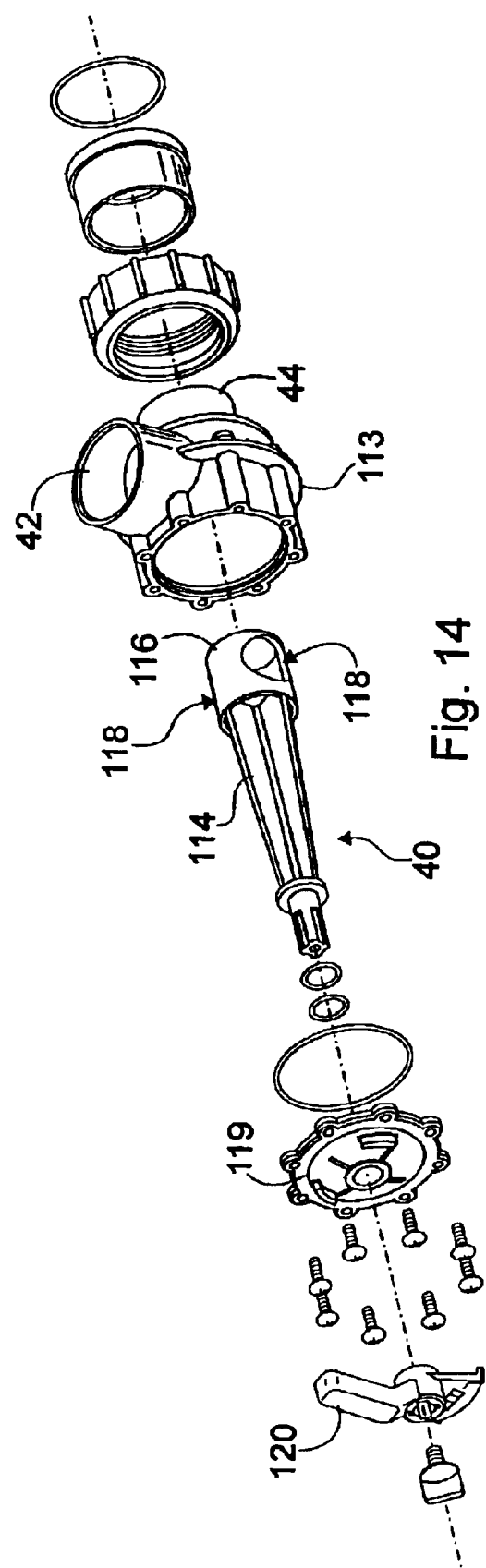
FIG. 14 is an exploded view of the diverter valve included in the inventive self-cleaning filter.

Referring to FIGS. 1–2 and 14, the diverter valve 40 includes a housing 113 mountable to the water filter 10 at the filter inlet port 41. The housing 113 includes the diverter inlet 42 receiving pool water to be filtered, and the diverter outlet 44 attached to the filter inlet port 41 and directing the pool water to be filtered into the filter 10. A diverter element 114 is mounted in the diverter housing 113 and extends into the water filter 10 with the diverter housing 113 mounted thereto. The diverter element 114 includes an elongate body having a hollow cylindrical end portion 116 extending into the water filter 10 with the diverter housing 113 mounted thereto. The hollow cylindrical end portion 116 includes apertures 118 formed on opposite sides, i.e., 180° apart. The other end of the diverter elongate body extends through a housing cap 119 and is keyed to a handle 120. The diverter element 114 is positionable between a first position in which the apertures 118 are substantially horizontally aligned, and a second position in which the apertures 118 are substantially vertically aligned. Rotation of the diverter element 114, via the handle 120, 90° in either direction will rotate the diverter element 114 between the first and second positions. It should be understood, however, that other angular alignments of the apertures 118 may be implemented to define the first and second positions without departing from the spirit and scope of the present invention.

In operation, open tip of the cylindrical end portion 116 is closed off. Water flows through the diverter valve 40 and into the filter 10 through the cylindrical end portion 116. With the diverter valve 40/diverter element 114 in the first position, the pool water to be filtered is split 180° and flows out of the apertures 118 and into the filter housing 12 where it is filtered in the manner previously described. Rotation of the diverter element 114, via the handle 120, to the second position causes one of the apertures 118 to be blocked off and the other aperture 118 to be in fluid communication with the water spray manifold 46. Thus, water entering the diverter valve 40 is provided to the water spray manifold 46 for cleaning the filter cartridge 20 in the manner previously described. A hose (not shown) is connected to the lower portion of the water spray manifold 46 for allowing a portion of the water to be tapped off and supplied to the inlet 68 of the manifold 58 to energize the hydrodynamic bearing 24 for cleaning.

Since the inventive filter 10 contemplates using the same pool water that is provided for filtering for cleaning purposes, it is understood that a certain amount of pool water will be lost during the cleaning cycle. However, as an example only, adequate cleaning of the filter cartridge 20 should typically take between 0.75–1.0 minutes, and even with regular periodic cleaning of the filter cartridge 20 the volume of water used for cleaning will typically be small compared to the total volume of water in the pool or other water source being filtered. The time for cleaning the filter cartridge will depend on various factors, including, but not limited to, the size of the filter cartridge as well as the amount of dirt and other solid particles collected on the filter cartridge.

While the present invention has been described with particular reference to the drawings, it should be understood that various modifications could be made without departing from the spirit and scope of the present invention. For example, while the present invention has been described for use in filtering pool water, virtually any type of liquid may be filtered by the inventive filter 10 without departing from the spirit and scope of the present invention. Additionally, the various components of the inventive filter 10 are fully backward compatible and the various components of the inventive filter 10 can be sold as a retrofit unit for filters not originally equipped for such self-cleaning.

I claim:

1. A hydrodynamic bearing comprising:
   a stationary manifold having an inlet for receiving a flow of liquid;
   a first bearing member received in and attached to the manifold, the first bearing member comprising an inner cylindrical wall having an axis, an outer cylindrical wall radially spaced from and coaxial with the inner cylindrical wall, a bottom member connected between the inner and outer cylindrical walls, and a first disc member extending radially outward from the outer cylindrical wall,
   wherein the outer cylindrical wall, the first disc member and the manifold define a channel for the received flow of liquid,
   wherein the outer cylindrical wall includes a plurality of radial dynamic pressure generating apertures communicating with the channel, and
   wherein the first disc member includes a plurality of axial dynamic pressure generating apertures communicating with the channel; and
   a second bearing member designed to support an object for rotation about the axis, the second bearing member comprising a cylindrical portion received between the inner and outer cylindrical walls of the first bearing member, and a second disc member extending radially outward from the cylindrical portion and facing the first disc member,
   wherein pressurized liquid provided against (a) the cylindrical portion via the radial dynamic pressure generating apertures, and (b) the second disc member via the axial dynamic pressure generating apertures, allows the second bearing member and an object thereon to rotate about the axis.

2. The hydrodynamic bearing of claim 1, wherein the pressurized liquid is provided to allow rotation of the second bearing member with the hydrodynamic bearing in an energized state.

3. The hydrodynamic bearing of claim 2, wherein the first and second disc members cooperate to form a seal preventing liquid from flowing into the hydrodynamic bearing with the hydrodynamic bearing in an unenergized state and permitting a minimal amount of liquid to flow out of the hydrodynamic bearing with the hydrodynamic bearing in the energized state.

4. The hydrodynamic bearing of claim 3, wherein the seal comprises cooperating teeth formed on facing surfaces of the first and second disc members at outer circumferential portions thereof.

5. The hydrodynamic bearing of claim 1, wherein an inner surface of the outer cylindrical wall of the first bearing member includes a plurality of dynamic pressure generating grooves cooperating, one each, with the plurality of radial dynamic pressure generating apertures.

6. The hydrodynamic bearing of claim 5, wherein the plurality of dynamic pressure generating grooves extend axially substantially parallel to the axis.

7. The hydrodynamic bearing of claim 1, wherein a top surface of the first disc member includes a plurality of dynamic pressure generating recessed portions cooperating, one each, with the plurality of axial dynamic pressure generating apertures.

8. The hydrodynamic bearing of claim 1, wherein the manifold comprises a toroidal-shaped manifold.

9. The hydrodynamic bearing of claim 1, wherein the liquid comprises water.

10. The hydrodynamic bearing of claim 9, employed in a water filter device having a cylindrical cartridge filter element supported on the second bearing member of the hydrodynamic bearing for rotation about the axis.

11. The hydrodynamic bearing of claim 10, wherein the hydrodynamic bearing allows the cylindrical cartridge filter element to rotate about the axis via a water spray from a water spray manifold provided in the water filter device.

12. A hydrodynamic bearing comprising:
   a stationary manifold having an inlet for receiving a pressurized flow of liquid;
   a stationary first bearing member attached to the manifold and having a stationary shaft member having an axis, the first bearing member and manifold defining a channel for the received pressurized flow of liquid, wherein the first bearing member includes pluralities of radial and axial dynamic pressure generating apertures in communication with the channel; and
   a second bearing member received on the stationary shaft member and rotatable about the axis, the second bearing member configured to support an object for rotation about the axis, wherein pressurized liquid is provided against the second bearing member via the radial and axial dynamic pressure generating apertures in the first bearing member providing journal bearing and thrust bearing forces, respectively, against the second bearing member allowing the second bearing member and an object thereon to rotate about the axis.

13. The hydrodynamic bearing of claim 12, wherein the liquid comprises water.

14. The hydrodynamic bearing of claim 12, wherein the first bearing member includes a plurality of dynamic pressure generating grooves radially facing the second bearing member and cooperating, one each, with the plurality of radial dynamic pressure generating apertures.

15. The hydrodynamic bearing of claim 14, wherein the pluralities of dynamic pressure generating grooves and apertures are equiangularly spaced about the axis.

16. The hydrodynamic bearing of claim 12, wherein the first bearing member includes a plurality of dynamic pressure generating recessed portions axially facing the second bearing member and cooperating, one each, with the plurality of axial dynamic pressure generating apertures.

17. The hydrodynamic bearing of claim 16, wherein the pluralities of dynamic pressure generating recessed portions and apertures are equiangularly spaced about the axis.

18. The hydrodynamic bearing of claim 12, wherein the pressurized liquid is provided to allow rotation of the second bearing member with the hydrodynamic bearing in an energized state.

19. The hydrodynamic bearing of claim 18, wherein the first and second bearing members include first and second disc members, respectively, facing each other and cooperating to form a seal preventing liquid from flowing into the hydrodynamic bearing with the hydrodynamic bearing in an unenergized state and permitting a minimal amount of liquid to flow out of the hydrodynamic bearing with the hydrodynamic bearing in the energized state.

20. The hydrodynamic bearing of claim 19, wherein the seal comprises cooperating teeth formed on facing surfaces of the first and second disc members at outer circumferential portions thereof.

* * * * *